(12) United States Patent
Huissoon

(10) Patent No.: US 9,863,121 B2
(45) Date of Patent: Jan. 9, 2018

(54) MOBILE APPARATUS

(71) Applicant: Hudson Bay Holding B.V., 's-Heer Arendskerke (NL)

(72) Inventor: Leendert Wilhelmus Cornelis Huissoon, Kruiningen (NL)

(73) Assignee: Hudson Bay Holding B.V., 's-Heer Arendskerke (NL)

( * ) Notice: Subject to any disclaimer, the term of this patent is extended or adjusted under 35 U.S.C. 154(b) by 0 days.

(21) Appl. No.: 14/391,592

(22) PCT Filed: Apr. 12, 2013

(86) PCT No.: PCT/NL2013/050269
§ 371 (c)(1),
(2) Date: Oct. 9, 2014

(87) PCT Pub. No.: WO2013/154434
PCT Pub. Date: Oct. 17, 2013

(65) Prior Publication Data
US 2015/0101878 A1    Apr. 16, 2015

(30) Foreign Application Priority Data

Apr. 13, 2012 (NL) ..................................... 2008634

(51) Int. Cl.
*E02F 9/08* (2006.01)
*E02F 3/32* (2006.01)
(Continued)

(52) U.S. Cl.
CPC ............ *E02F 9/0808* (2013.01); *B62D 25/10* (2013.01); *B62D 33/067* (2013.01); *E02F 3/325* (2013.01); *E02F 9/0866* (2013.01); *E02F 9/0883* (2013.01); *E02F 9/0891* (2013.01); *E02F 9/166* (2013.01); *B62D 33/0617* (2013.01)

(58) Field of Classification Search
CPC ....... E02F 9/166; E02F 9/0808; E02F 9/0883; E02F 9/0891; E02F 9/0858; E02F 9/0875; E02F 9/0866; E02F 9/12; E02F 3/325; B62D 25/10; B62D 33/067; B62D 33/0617

See application file for complete search history.

(56) References Cited

U.S. PATENT DOCUMENTS 3,847,244 A * 11/1974 Fairbanks, Jr. ........ B62D 33/07
180/89.15
4,151,822 A * 5/1979 Miura ..................... F16F 1/387
123/192.1
(Continued)

FOREIGN PATENT DOCUMENTS

DE  102004027202 A1 * 10/2005 ............. B62D 25/10
EP      1306490 A1 *  5/2003 ............. B60K 11/04
(Continued)

*Primary Examiner* — James A Shriver, II
*Assistant Examiner* — Steve Clemmons
(74) *Attorney, Agent, or Firm* — The Webb Law Firm

(57) ABSTRACT

Disclosed is a mobile apparatus, including a frame, and operating arm connected to the frame, a cab with one or more cab seats, drive means configured to drive the mobile apparatus and/or the operating arm, and at least one tank, wherein the at least one tank is positioned under the one or more cab seats.

18 Claims, 5 Drawing Sheets

(51) Int. Cl.
  *E02F 9/16* (2006.01)
  *B62D 25/10* (2006.01)
  *B62D 33/067* (2006.01)
  *B62D 33/06* (2006.01)

(56) References Cited

U.S. PATENT DOCUMENTS

| | | | | |
|---|---|---|---|---|
| 4,616,872 A * | 10/1986 | Akira | ............... | B62D 33/06 180/89.12 |
| 5,563,451 A * | 10/1996 | Furukawa | ............... | B60K 25/06 180/53.8 |
| 5,671,820 A * | 9/1997 | Kobayashi | ............... | B62D 25/10 180/328 |
| 6,058,903 A * | 5/2000 | Downham | ............... | B62D 25/10 123/195 C |
| 6,357,820 B1 * | 3/2002 | Nagatsuka | ............... | E02F 3/3414 180/89.14 |
| 6,409,457 B1 | 6/2002 | Korycan et al. | | |
| 6,684,537 B2 * | 2/2004 | Ichikawa | ............... | E02F 3/32 37/347 |
| 7,117,952 B2 * | 10/2006 | Bares | ............... | E02F 3/405 172/40 |
| 7,287,949 B2 | 10/2007 | Huissoon | | |
| 7,401,848 B2 * | 7/2008 | Haboon | ............... | E02F 9/166 296/190.08 |
| 7,523,804 B2 * | 4/2009 | Tanaka | ............... | B60K 15/073 180/291 |
| 7,654,349 B2 * | 2/2010 | Lee | ............... | B60K 6/26 180/53.8 |
| 7,673,713 B2 * | 3/2010 | Betz | ............... | B60L 1/003 180/65.1 |
| 7,900,996 B2 * | 3/2011 | Kimura | ............... | B60H 1/00378 296/190.09 |
| 7,909,389 B2 * | 3/2011 | Bell | ............... | B62D 33/067 180/89.14 |
| 8,196,555 B2 * | 6/2012 | Ikeda | ............... | E02F 9/0866 123/41.49 |
| 8,267,217 B2 * | 9/2012 | Kotani | ............... | B62D 33/0617 180/312 |
| 8,505,290 B2 * | 8/2013 | Sakai | ............... | E02F 3/325 60/435 |
| 8,700,246 B2 * | 4/2014 | Kurikuma | ............... | E02F 3/325 701/22 |
| 8,967,309 B2 * | 3/2015 | Kimura | ............... | B60H 1/00378 180/68.1 |
| 9,062,691 B2 * | 6/2015 | Kawamoto | ............... | E02F 9/0883 |
| 2004/0200356 A1 | 10/2004 | Kuperus | | |
| 2004/0244521 A1 * | 12/2004 | Russ | ............... | B66C 23/84 74/425 |
| 2006/0080930 A1 * | 4/2006 | Brindle | ............... | B62D 21/186 52/655.1 |
| 2006/0185200 A1 * | 8/2006 | Sugiyama | ............... | B62D 25/10 37/466 |
| 2007/0131466 A1 * | 6/2007 | Gutzwiller | ............... | E02F 9/0833 180/89.1 |
| 2011/0176899 A1 * | 7/2011 | Huissoon | ............... | E02F 3/301 414/687 |
| 2012/0067661 A1 | 3/2012 | Kashu et al. | | |
| 2012/0273648 A1 * | 11/2012 | Maske | ............... | B60K 13/04 248/636 |
| 2013/0108405 A1 | 5/2013 | Huissoon | | |
| 2013/0149095 A1 | 6/2013 | Huissoon | | |

FOREIGN PATENT DOCUMENTS

| | | | | |
|---|---|---|---|---|
| JP | 6176865 U | | 5/1986 | |
| JP | 6180122 U | | 5/1986 | |
| JP | 62185683 U | | 11/1987 | |
| JP | 6320962 A | | 11/1994 | |
| JP | 685455 U | | 12/1994 | |
| JP | 11190044 A | * | 7/1999 | |
| JP | 11336124 A | | 12/1999 | |
| JP | 11343639 A | | 12/1999 | |
| JP | 2001159154 A | | 6/2001 | |
| JP | 2001288778 A | | 10/2001 | |
| JP | 2003211983 A | * | 7/2003 | |
| JP | 4243772 B2 | * | 3/2009 | ............... E02F 9/00 |
| KR | 20090083271 A | * | 8/2009 | ............... E02F 9/166 |
| NL | 1019918 C | | 1/2003 | |
| NL | 1027370 C | | 7/2006 | |
| NL | 1028661 C | | 12/2006 | |
| NL | 1035694 C | | 3/2010 | |
| NL | 2002125 C | | 3/2010 | |
| NL | 2004954 C | | 7/2011 | |
| NL | 2004784 C | | 12/2011 | |
| WO | WO 9106465 A1 | * | 5/1991 | ............... B60R 13/0838 |
| WO | WO 0183895 A1 | * | 11/2001 | ............... B60K 11/04 |
| WO | WO-2010008277 A1 | * | 1/2010 | ............... E02F 3/301 |
| WO | 2011152709 A2 | | 12/2011 | |

* cited by examiner

MOBILE APPARATUS

CROSS-REFERENCE TO RELATED APPLICATIONS

This application is the United States national phase of International Application No. PCT/NL2013/050269 filed Apr. 12, 2013, and claims priority to Netherlands Patent Application No. 2008634 filed Apr. 13, 2012, the disclosures of which are hereby incorporated in their entirety by reference.

FIELD OF THE INVENTION

The present invention relates to the field of mobile apparatuses with operating arm, such as for instance excavators, wheel loaders and tractors.

BACKGROUND

Known mobile apparatuses are described in, among others, the patent specifications NL2004954, NL2004784, NL2002125, NL1035694, NL1028661, NL1027370 and NL1019918 in the name of applicant.

SUMMARY OF THE INVENTION

Embodiments of the present invention have the object of providing an improved mobile apparatus, and particularly with an improved packaging of a frame in or on which the parts of the mobile apparatus are positioned.

According to an aspect of the present invention, a mobile apparatus is provided comprising a frame, which can be a main frame or a sub-frame connected in rotatable manner to a main frame. The technical components are preferably positioned relative to each other in a manner such that, as seen in a forward direction of travel, the heaviest components are mounted on the rear side of the frame and the lightest components on the front side. The coupling of these components is preferably such that the connecting elements such as conduits and cabling are short and effective. The interior space of the cab, and thus the ergonomics in the cab for the driver and possible co-drivers, is further preferably optimal.

The mobile apparatus is preferably a mobile apparatus for earth-moving and agricultural machines. The main frame is preferably displaceable on wheels or caterpillar tracks.

According to an embodiment of the mobile apparatus according to the invention, the mobile apparatus comprises a frame, an operating arm connected to the frame, a cab with one or more cab seats, drive means configured to drive the mobile apparatus and/or the operating arm, and at least one tank. The at least one tank is positioned under the one or more cab seats. The at least one tank preferably comprises a first tank and a second tank which, as seen in a width direction perpendicularly of a forward direction of travel of the mobile apparatus, are arranged mutually adjacently and at a mutual distance on the frame under the one or more cab seats. The first tank is for instance a tank for hydraulic liquid and the second tank a fuel tank. The one or more cab seats preferably extend over substantially the full width of the cab.

According to a possible embodiment the frame is a main frame. According to another preferred embodiment the frame is a partially rotatable or wholly rotatable sub-frame rotatable relative to a main frame. The described positioning of the present invention is highly suitable for this purpose.

According to an embodiment of the mobile apparatus according to the invention, the mobile apparatus comprises a frame, an operating arm connected to the frame, a cab with one or more cab seats, drive means configured to drive the mobile apparatus and/or the operating arm. The drive means, typically a motor, optionally with battery pack, for driving the frame and/or the operating arm is positioned behind the cab as seen in the direction of travel so that the large mass of the motor contributes as counterweight to the mass in the operating arm provided at the front.

In preferred embodiments hydraulic pumps or generators or electric motors are mounted on both sides of the motor for the drive or the operating arm, this providing for a better balance compared to a positioning in which the pumps and/or generators are mounted on one side.

In preferred embodiments a motor for driving a gear ring is provided for the purpose of moving the sub-frame relative to the main frame. This gear ring motor is preferably positioned under the cab, between the above discussed first and second tanks, preferably behind the gear ring. This once again has the result that the different masses are placed as far to the rear as possible and that leg-room is created in the cab.

In preferred embodiments a valve block for controlling the operating arm is positioned on the right-hand side of the frame, wherein the conduits run on the right adjacently of the frame and under the right-hand side of the cab.

In preferred embodiments an exhaust gas filter system of the motor is mounted vertically behind and on a side of the cab. The same applies for the condenser of the air-conditioning system.

In preferred embodiments a sub-frame is mounted on the frame, from which sub-frame the rear side of the cab can be suspended. This imparts the necessary stability to the cab because the suspension points of the cab can in this way be mounted at a relatively high position. The sub-frame is preferably an upright sub-frame against which the back of the cab can rest and to which the back of the cab can be connected.

According to a possible embodiment, the exhaust gas filter system or the condenser for the air-conditioning can be mounted on this sub-frame, on the rear side thereof.

In an embodiment the frame is provided with a motor sub-frame, on which motor sub-frame is mounted the motor with pumps and cooling pack. This motor sub-frame enables quicker and simpler assembly.

Provided according to another aspect on the front side of the frame is a contact surface with openings to which the air channels of the air-conditioning of the cab connect when the cab is folded closed on the frame. The conduits of the air-conditioning system can in this way be mounted solely on the frame, and conduits to the cab are not necessary.

Provided according to another aspect of the invention is a mobile apparatus comprising a frame, an operating arm, a cab with a driver's seat and with a rear side lying behind the driver's seat as seen in a forward direction of travel (R) of the mobile apparatus, drive means configured to move the mobile apparatus and/or the operating arm, and a motor bonnet movable between an open and a closed position in order to provide access to the drive means. The bonnet is mounted pivotally via a pivot shaft on the rear side of the cab, this such that the bonnet is pivotable away from the cab and away from the drive means in upward direction.

Broadly speaking for all mobile apparatuses an embodiment of the invention relates to a bonnet which pivots away from the cab and away from the motor in upward direction via a pivot point on an upper side and rear side of the cab.

All components on the rear of the frame are in this way very easily accessible by maintenance staff.

In a further embodiment the bonnet pivots away from the cab and from the motor in upward direction via a pivot point on the upper side and rear side of an upright sub-frame from which the rear side of the cab can be suspended. According to an alternative embodiment, the pivot point is provided on a motor sub-frame, which motor sub-frame bears the motor.

In a further embodiment a protective cover is provided obliquely behind and under the motor. It can be removed in simple manner so that maintenance staff can easily work under the motor, the pumps and generators.

A further embodiment has a pump control on the front side on the frame, whereby the cab can pivot forward. The person operating the pump control has in this way a direct view of the pivoting angle of the cab.

In an embodiment one or more socket outlets are provided which are arranged on the left-hand side of the frame under the cab. Plugs of electrical tools can be inserted into these socket outlets. The position of these socket outlets is such that the plugs are not easily overlooked, since they lie within the field of vision of someone entering the cab.

A further embodiment has side covers on the frame on either side of the cab. These are removable for maintenance of the components located therebehind, such as electronics, hydraulics and filters for the air-conditioning system.

A further embodiment has electronic components on the front side of the frame, on one side or on both sides, which can be viewed and serviced from the cab. Fuses for instance can thus be checked from the cab, or indicator lamps can be viewed from the seat. Because these electronic components are not mounted on the cab but on the frame, no cables run through the cab.

A further embodiment has a cab which is provided with two doors, a left-hand and a right-hand door. The described positioning of the components is highly suitable for creating space in the cab for at least one person, wherein two or three persons can also sit comfortably. The exit on the right-hand side therefore provides extra comfort, certainly in the case of a rotating upper carriage.

BRIEF DESCRIPTION OF THE DRAWINGS

The above stated and other advantageous features and objects of the invention will become more apparent, and the invention better understood, on the basis of the following detailed description when read in combination with the accompanying drawings, in which.

DESCRIPTION OF THE INVENTION

Figure 1:
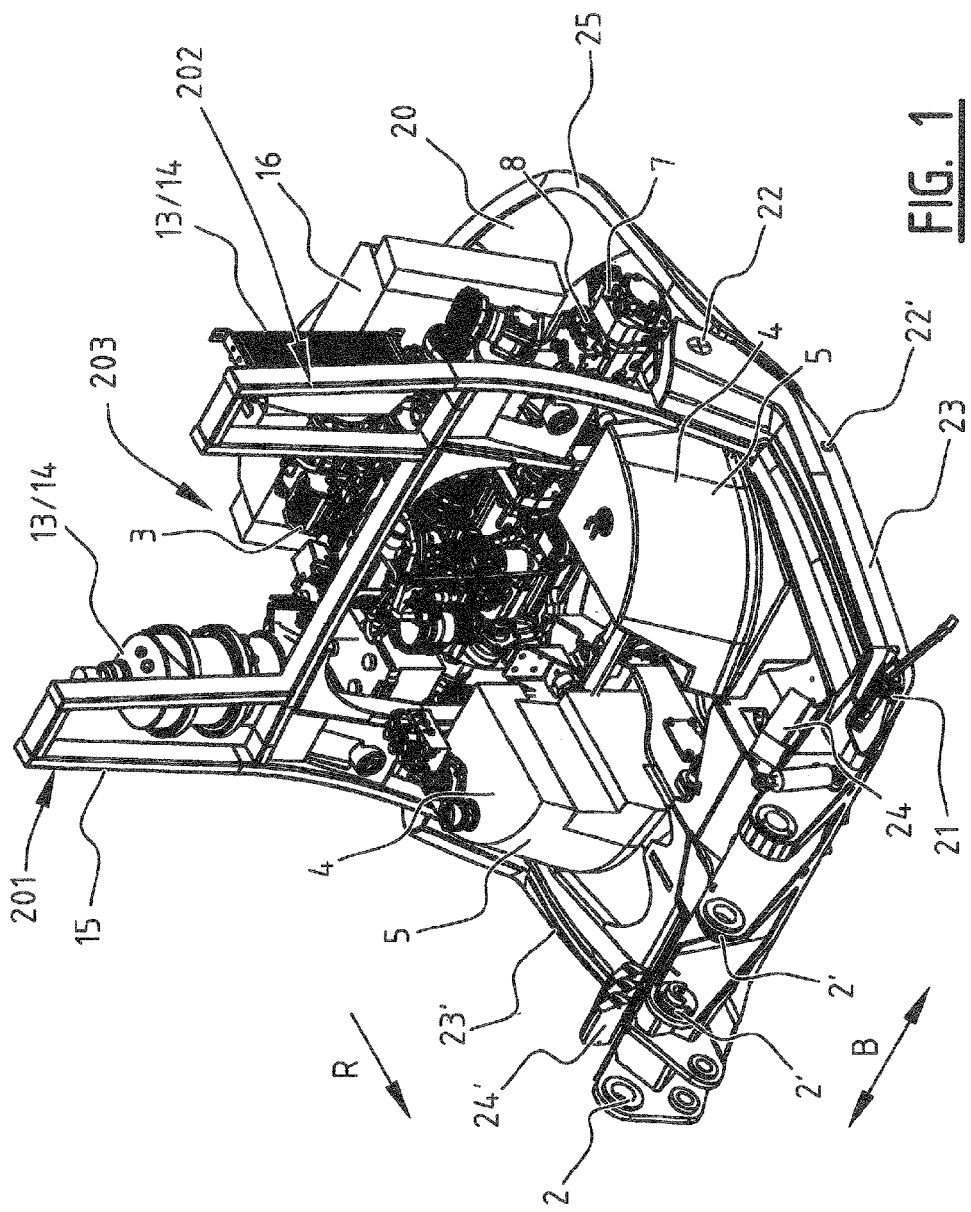
FIG. 1 is a schematic perspective view of a frame with parts of an embodiment of a mobile apparatus according to the invention, wherein the cab and bonnet are omitted.

FIGS. 1-5 illustrate a possible embodiment of a mobile apparatus. The different measures and features of the mobile apparatus are illustrated in combination with each other for this embodiment, although the skilled person will appreciate that they can also be applied individually on existing mobile apparatuses. The mobile apparatus comprises a frame 1. The frame is provided with a number of pivot points 2, 2' to which components of an operating arm (not shown) are connectable. As shown best in FIGS. 3-5, the mobile apparatus comprises a cab 6 with one or more seats (not shown) for one or more drivers of the mobile apparatus. Frame 1 is provided with drive means 3 which can take the form of a motor or a motor with battery pack and which are intended to drive the mobile apparatus and/or the operating arm. Two tanks are further provided: a first tank 4 for a hydraulic liquid and a second tank 5 for a fuel. The invention is not limited to two tanks, and the skilled person will appreciate that more than two tanks may also be provided.

The two tanks 4, 5 are positioned under the one or more seats such that the one or more cab seats can extend over substantially the full width of the cab. The first and second tanks 4, 5 are arranged mutually adjacently and at a mutual distance on frame 1, as seen in a width direction B perpendicularly of a forward direction of travel R of the mobile apparatus. Drive means 3 comprise a motor or a motor with battery pack and are positioned behind the at least one tank as seen in the direction of travel R. One or more hydraulic pumps 7, generators or electric motors 8 can further be mounted on both sides of motor 3 as seen in the width direction B.

The relatively light components are in this way provided at the front of the frame, while the relatively heavy components are provided at the rear. A good counterweight to the operating arm is thus created. Such a construction has particular advantages when frame 1 is a rotatable sub-frame, as in the illustrated embodiment. Sub-frame 1 is intended for rotatable mounting on a main frame (not shown) via a gear ring. Arranged between the first and second tanks 4, 5 is a gear ring motor 9 for driving the gear ring. Further provided is a rotary joint 10 which is placed in front of the gear ring motor as seen in the direction of travel, see FIG. 2. Further provided is a valve block 11 which is configured to control the operating arm. Valve block 11 is positioned on the right-hand side of the frame as seen in the direction of travel, and conduits 12 connected to the valve block run on the right adjacently of the frame and under the right-hand side of cab 6.

A filter system 13 for the exhaust gases of motor 3 can also be provided. Filter system 13 is mounted on a rear side of cab 6 as seen in the direction of travel. Typically further provided are an air-conditioning system and a condenser 14 for cooling the air-conditioning system. Condenser 14 is preferably mounted on a rear side of the cab as seen in the direction of travel R. In the illustrated embodiment a sub-frame 15 with an upright part is mounted on the frame. In the closed position of cab 6 the rear side of the cab is supported against this upright part and is connected mechanically to this upright part. Filter system 13 and/or condenser 14 are preferably mounted on the rear side of sub-frame 15.

A rear sub-frame 25 is further mounted on frame 1 substantially behind the cab as seen in the direction of travel. The rear sub-frame 25 runs obliquely upward to the rear, and motor 3 with pumps 7 and a cooling pack 16, among other parts, are mounted on this sub-frame 25.

Figure 2:
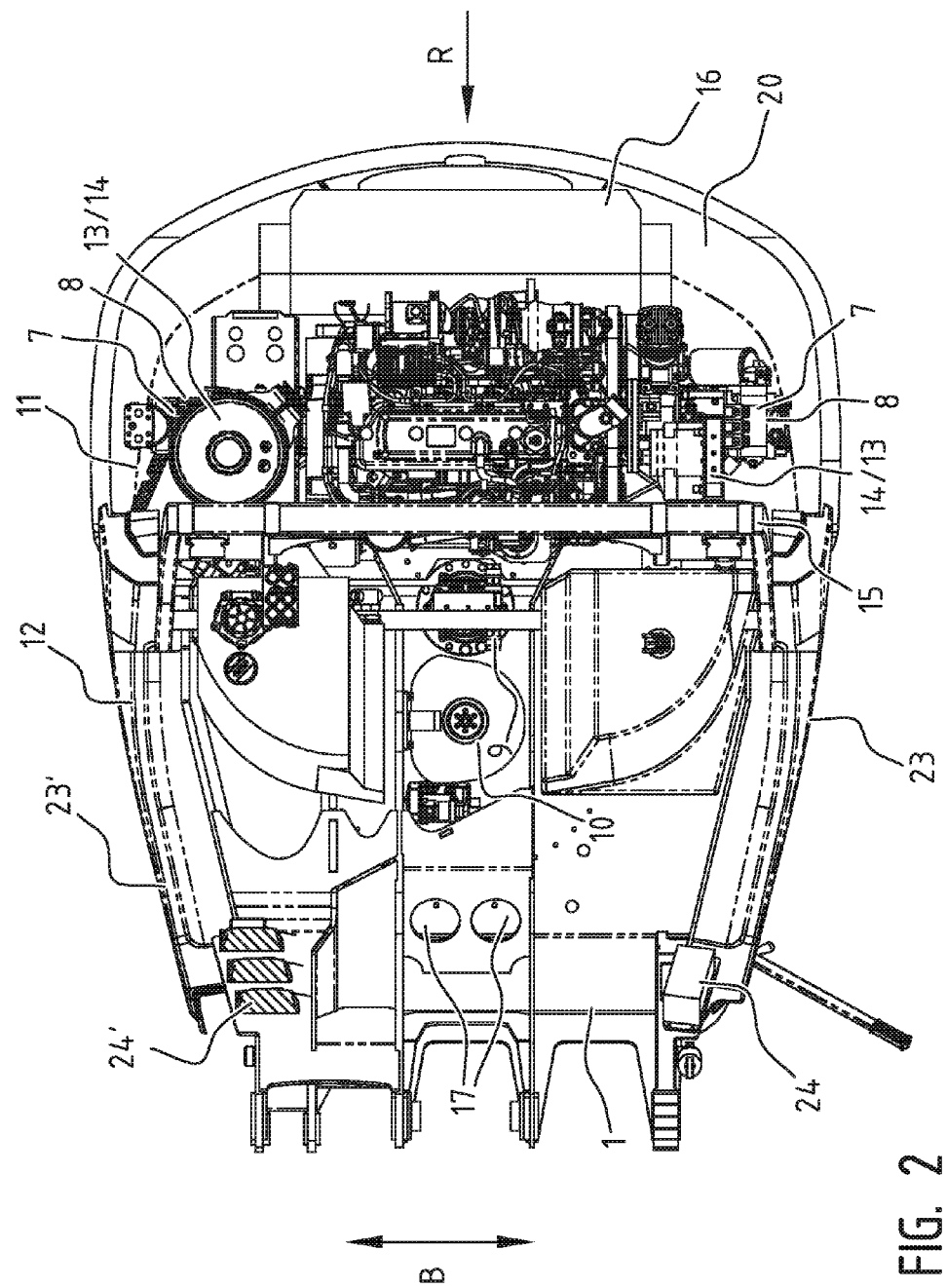
FIG. 2 is a schematic top view of the frame with parts of FIG. 1.

Formed on a front side of the frame is a contact surface with openings 17, see FIG. 2. Cab 6 is provided with air channels (not shown) of the air-conditioning system which connect to openings 17 when the cab is folded closed on the frame.

Figure 3:
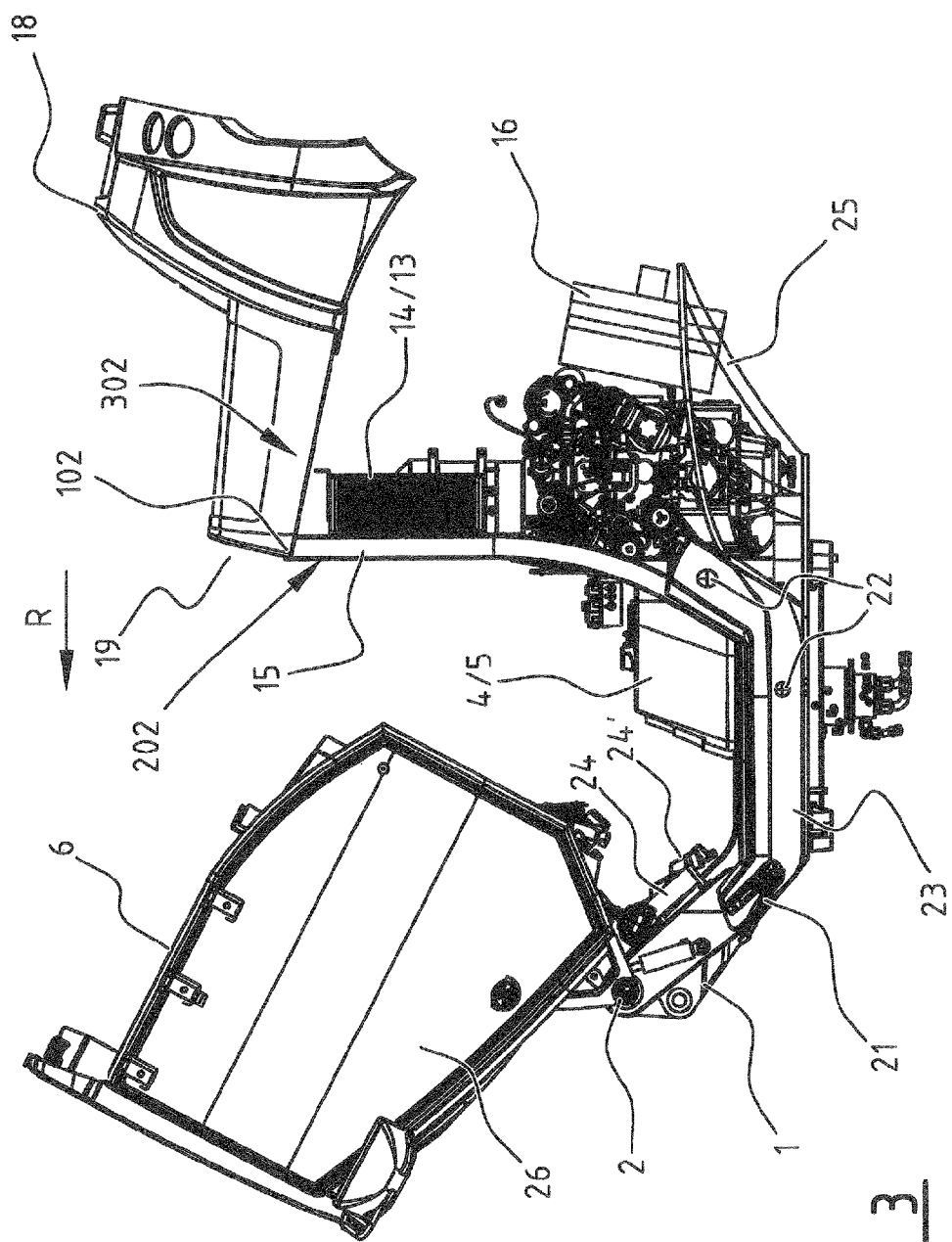
FIG. 3 is a schematic side view of the frame with parts of FIG. 1 with cab and bonnet in an open position.
Figure 4:
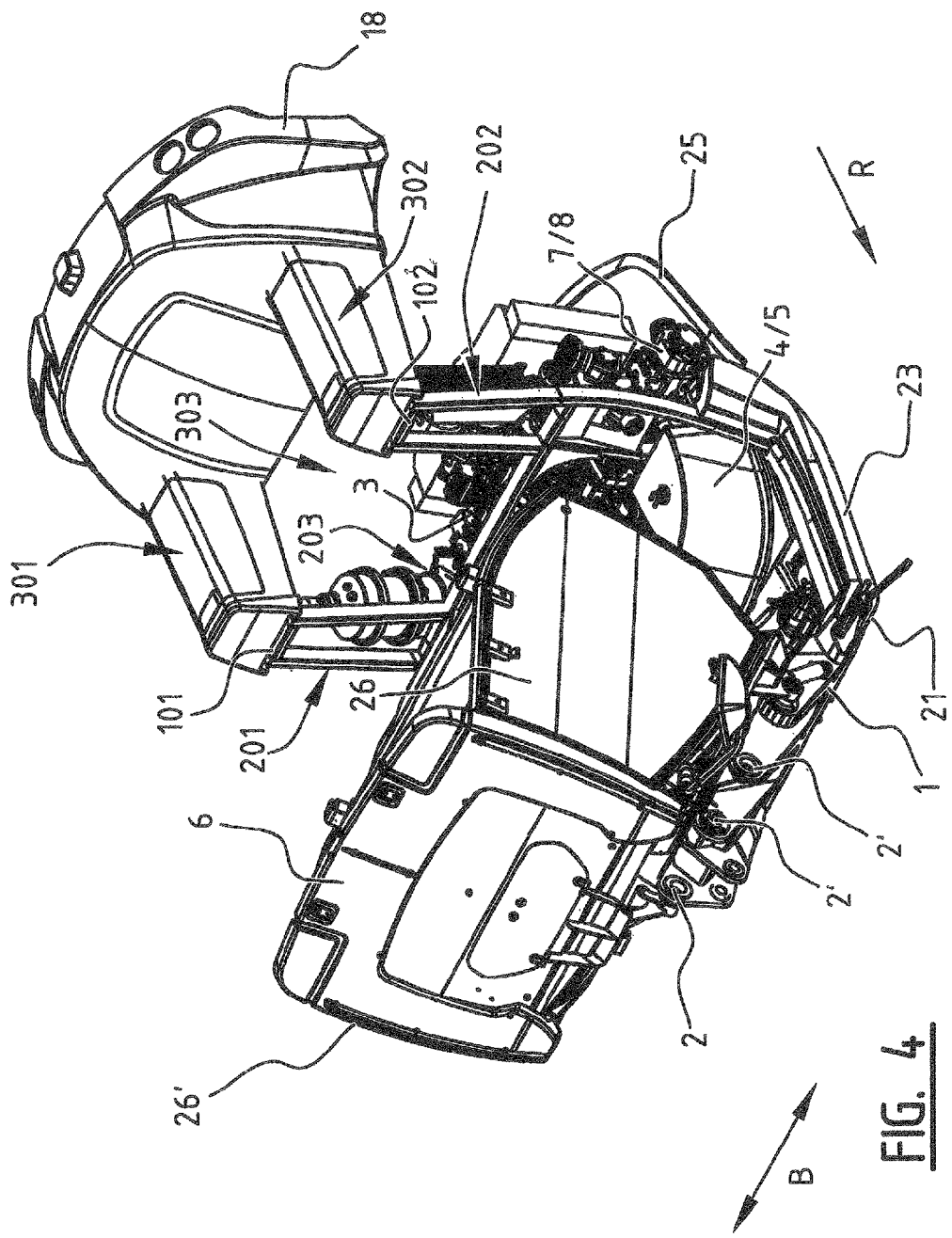
FIG. 4 is a schematic perspective view of the frame with parts of FIG. 1 with cab and bonnet.
Figure 5:
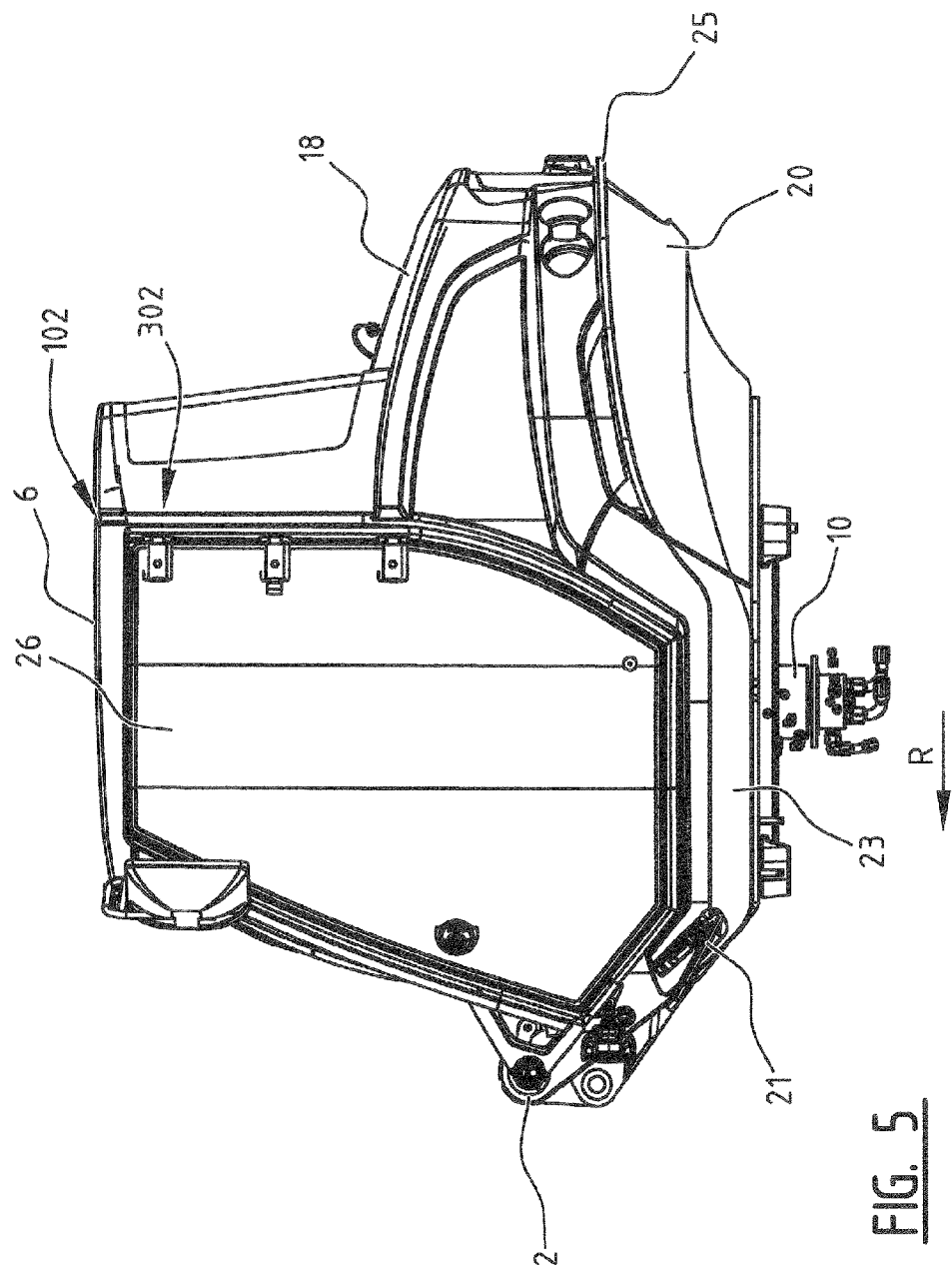
FIG. 5 is a schematic side view of the frame with parts of FIG. 1 with cab and bonnet in a closed position.

FIGS. 3-5 illustrate that a bonnet 18 is provided which is movable between an open and a closed position so as to provide access to drive means 3. The bonnet is mounted pivotally via a pivot point in an area 19 on the rear side of the cab such that bonnet 18 is pivotable away from the cab and away from drive means 3 in upward direction. The one or more pivot points are preferably provided at the top of the upright sub-frame 15, against which the rear side of the cab rests in the operative position of the cab.

A protective cover 20 can further be removably arranged obliquely behind and under drive means 3. Removable side covers 23 are also arranged on either side of cab 6 and under cab 6.

Cab 6 is preferably mounted for pivoting relative to frame 1 around a pivot point located on the front side of cab 6 such that the cab can pivot forward as seen in the direction of travel, see FIG. 3.

Additional optional measures are: a pump control 21 for pivoting the cab which is provided on the frame on a left-hand front side of the cab as seen in the direction of travel; one or more socket outlets 22 which are arranged under the cab on a left-hand side of the frame as seen in the direction of travel; electrical components 24 which are mounted on a front side of frame 1 on at least one side thereof and which can be viewed and serviced from the cab.

Cab 6 is preferably provided with a left-hand and a right-hand door 26, 26' on either side of cab 6.

As shown in FIG. 3, bonnet 18 is movable between an open and a closed position in order to provide access to drive means 3. Upright sub-frame 15 is mounted on frame 1, substantially behind cab 6. FIG. 4 shows that bonnet 18 is mounted pivotally via a first pivot point 101 and a second pivot point 102 in an area at the rear side of the cab 6, this such that bonnet 18 is pivotable away from the cab 6 and away from the drive means 3 in upward direction. First and second pivot point 101, 102 are provided at an upper part of upright sub-frame 15. Upright sub-frame 15 has a left upwardly directed sub-frame top portion 201 and a right upwardly directed sub-frame top portion 202 and an empty space 203 between the left and right upwardly directed top portions 201, 202, see also FIG. 1. Left and right upwardly directed sub-frame top portions 201, 202 are provided with first and the second pivot point 101, 102, respectively. Bonnet 18 comprises a left and a right upwardly directed bonnet top portion 301, 302 and an empty space 303 between the left and right upwardly directed bonnet top portion 301, 302. Left and right upwardly directed sub-frame top portion 201, 202 is configured to receive left and a right upwardly directed bonnet top portion 301, 302, respectively, in the closed position of bonnet 18, see also FIG. 5. Bonnet 18 and the upright sub-frame 15 are configured such that, in the closed position of bonnet 18, empty space 203, 303 is formed between first and the second pivot point 101, 102 and such that, in the closed position of bonnet 18, the rear side of cab 6 is visible through empty space 203, 303.

The skilled person will appreciate that the present invention is not limited to the above described embodiment and that many modifications and variants can be envisaged within the scope of the invention, which is defined solely by the following claims.

The invention claimed is:

1. Mobile apparatus, comprising a frame, an operating arm connected to the frame, a cab with a driver's seat and with a rear side lying behind the driver's seat as seen in a forward direction of travel of the mobile apparatus, drive means configured to move the mobile apparatus and/or the operating arm, a bonnet movable between an open and a closed position in order to provide access to the drive means, and an upright sub-frame mounted on said frame substantially behind the cab, wherein the bonnet is mounted pivotally via a first and a second pivot point in an area at the rear side of the cab, such that the bonnet is pivotable away from the cab and away from the drive means in upward direction; wherein the first and second pivot point is provided at said upper part of said rear side of said upright sub-frame;

wherein the upright sub-frame has a left and a right upwardly directed sub-frame top portion and an empty space between the left and right upwardly directed top portions; said left and a right upwardly directed sub-frame top portion being provided with the first and the second pivot point, respectively;

wherein the bonnet comprises a left and a right upwardly directed bonnet top portion and an empty space between the left and right upwardly directed bonnet top portion; and wherein the left and right upwardly directed sub-frame top portion is configured to receive the left and right upwardly directed bonnet top portions, respectively, in the closed position of the bonnet; and wherein the bonnet and the upright sub-frame are configured such that, in the closed position of the bonnet, the empty space is formed between the first and the second pivot point and such that, in the closed position of the bonnet, the rear side of the cab is visible through said empty space.

2. Mobile apparatus as claimed in claim 1, wherein the rear side of the cab rests against the upright sub-frame in the operative position of the cab.

3. Mobile apparatus as claimed in claim 1, wherein a protective cover is removably arranged obliquely behind and under the drive means as seen in the direction of travel.

4. Mobile apparatus as claimed in claim 1, wherein the cab is mounted for pivoting relative to the frame around a pivot point located on the front side of the cab such that the cab can pivot forward as seen in the direction of travel.

5. Mobile apparatus as claimed in claim 4, wherein a pump control for pivoting the cab is provided on the frame on a left or right-hand front side of the cab as seen in the direction of travel.

6. Mobile apparatus as claimed in claim 5, wherein one or more socket outlets are arranged under the cab on a side of the frame as seen in the direction of travel.

7. Mobile apparatus as claimed in claim 1, wherein removable side covers are arranged on either side of the cab and under the cab.

8. Mobile apparatus as claimed in claim 1, wherein electronic components which can be viewed and serviced from the cab are mounted on a front side of the frame on at least one side.

9. Mobile apparatus as claimed in claim 1, wherein the cab is provided with a left-hand and a right-hand door on either side of the cab.

10. Mobile apparatus as claimed in claim 1, wherein the frame is rotatable relative to a main frame.

11. Mobile apparatus as claimed in claim 10, wherein the mobile apparatus further comprises a gear ring for the purpose of rotating the frame relative to the main frame, and that a gear ring motor for driving the gear ring is positioned between the first and the second tank.

12. Mobile apparatus as claimed in claim 11, wherein the mobile apparatus comprises a rotary joint and the gear ring motor is placed behind the rotary joint as seen in the direction of travel.

13. Mobile apparatus as claimed in claim 1, wherein the mobile apparatus comprises a valve block configured to control the operating arm, and that the valve block is positioned on a side of the frame, wherein conduits run adjacently of the frame and under a side of the cab.

14. Mobile apparatus as claimed in claim 1, wherein the mobile apparatus comprises a filter system for the exhaust gases of the drive means, which filter system is positioned on a rear side of the cab as seen in the direction of travel.

15. Mobile apparatus as claimed in claim 1, wherein the drive means comprise a motor, wherein a rear motor sub-frame is mounted on the frame substantially behind the cab as seen in the direction of travel, on which rear motor sub-frame is mounted the motor.

16. Mobile apparatus as claimed in claim 1, wherein a contact surface with openings is formed on a front side of the frame as seen in the direction of travel, and that the cab is provided with air channels of an air-conditioning system, which air channels connect to the openings when the cab is folded closed on the frame.

17. Mobile apparatus, comprising a frame rotatingly mounted relative to a main frame, said frame having an upper side, a front side, a rear side, and two lateral sides extending between the front and the rear side, an operating arm connected to the frame, a cab with a driver's seat and with a rear side lying behind the driver's seat as seen in a forward direction of travel of the mobile apparatus, drive means configured to move the mobile apparatus and/or the operating arm, the cab is provided with a left-hand and a right-hand door on either side of the cab; wherein the mobile apparatus comprises a valve block configured to control the operating arm, said valve block being positioned on the upper side of the frame, behind the rear side of the cab as seen in a forward direction of travel of the mobile apparatus, wherein conduits connected to the valve block run near one of the two lateral sides of the frame, adjacently of said one lateral side of the frame and under a lower side of the cab, under the left-hand or right-hand door of the cab.

18. Mobile apparatus as claimed in claim 17, wherein the at least one tank comprises a first tank and a second tank, which first and second tank, as seen in a width direction perpendicularly of a forward direction of travel of the mobile apparatus, are arranged mutually adjacently and at a mutual distance on the frame under the one or more cab seats; wherein the first tank is a tank for hydraulic liquid and that the second tank is a fuel tank.

\* \* \* \* \*